June 24, 1924.     1,498,823
J. W. VAN METER
METHOD OF CHLORINATING POOLS AND FILMING THE SURFACE THEREOF
Filed June 9, 1921
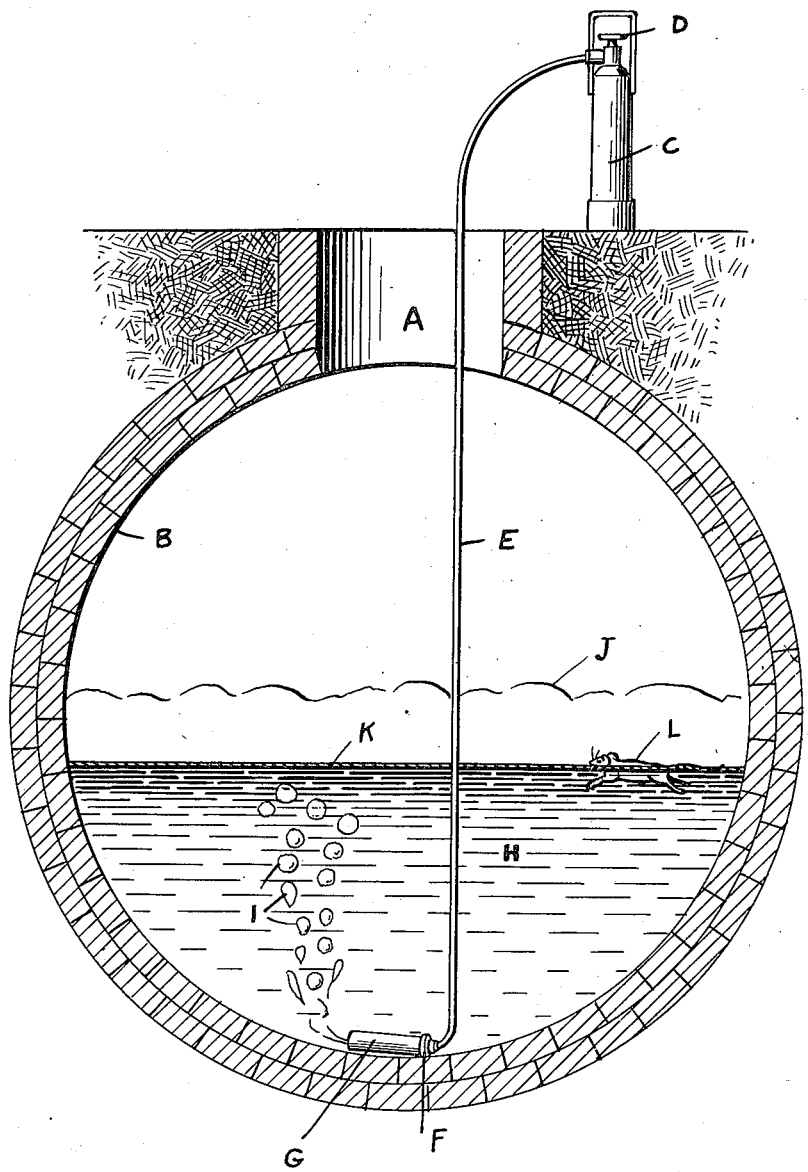
INVENTOR
JAMES W. VAN METER
BY
Bradley L. Benson
ATTORNEY Patented June 24, 1924.

1,498,823

UNITED STATES PATENT OFFICE.

JAMES W. VAN METER, OF SAN FRANCISCO, CALIFORNIA.

METHOD OF CHLORINATING POOLS AND FILMING THE SURFACE THEREOF.

Application filed June 9, 1921. Serial No. 476,239.

*To all whom it may concern:*

Be it known that I, JAMES W. VAN METER, a citizen of the United States of America, residing at 573 Market Street, San Francisco, in the county of San Francisco and State of California, have invented certain new and useful Improvements in Methods of Chlorinating Pools and Filming the Surface Thereof, of which the following is a specification.

The present invention is a method of forming a poisonous film on the surface of a body of water, such as a pool or the like, for the purpose of destroying animal and insect life.

The primary object is to provide a method whereby previously prepared chemical cartridges may be converted into gases under water and thereby give off poisonous fumes or gases which are lighter than water and heavier than air.

Another object is to include ingredients in said cartridges which, when converted as described, will condense and give off an oily substance which will thoroughly film the surface of a stagnant pool, sewage receptacle or the like.

As examples of the usefulness of my invention, I will mention the extermination of rats in sewers, of mosquitoes in stagnant pools, and the de-odorizing of tannery affluents and swamps infested with health-menacing life.

It is a well known fact that oil spread on the surface of a stagnant pool will destroy the larvæ of the mosquito. It does not, however, affect the adults, and oil, if used in quantities sufficient to be effective is obnoxious and costly.

By the use of my method better results are accomplished with much less material and, by using creosote as an agent, the resultant gases and residual oils are disinfectants and deodorizers. Because of the fact that the gases and oils are liberated under water, the gas in condensation is more readily diffused over the surface of the water. The previously prepared cartridges make for safety and cleanliness in the operation.

Referring to the accompanying drawing, the letter A indicates a man-hole, communicating with an underground sewer B. On the surface of the ground, at C, I show a cylinder containing chlorine under pressure. Chlorine is dispensed therefrom by opening a hand valve D. To the discharge nipple of the cylinder C is attached one end of a flexible hose E, the opposite end of which is connected to a socket F which removably engages a chemical cartridge G.

The contents of the cartridge G and the apparatus used in discharging same are fully described and claimed in my co-pending application for patent filed August 31, 1920, and bearing Serial Number 407,073 U. S. Patent 1,419,653, June 13, 1922. No claim is made in this application on the apparatus, but the claims presented herewith relate to the method of generating gases under water and the filming of the surface thereof.

The operation of my method is as follows; A cartridge, previously loaded with metallic particles, saw-dust, creosote and any desirable combustible gas-forming agent, is engaged in the socket F and the hose E lowered to the bottom of the sewage H. The valve D is now opened and chlorine under pressure passes through the hose E and through the cartridge G (the ends of which have been previously punctured) encountering the metallic elements and thereby setting up an intense chemical heat, forcing gas and the products of combustion out of the end of the cartridge remote from the socket F, as indicated by bubbles at I in the drawing.

The released gases rise to the surface of the water and, being heavier than air (because of the admixture of chlorine) hover on the surface as indicated at J in the drawing, and move with the sewage, spreading out at a uniform depth and traversing the length of the sewer B, without menacing life above ground.

The action of chlorine, in the presence of metallic elements, on creosote liberates an oil which completely films the surface of the water as indicated in section at K in the drawing.

It is a well known fact that most sewers are infested with rats, the sewers serving as avenues of travel. By the use of my method, the sewers may be entirely rid of rats. In the drawing I show a rat at L in the act of swimming the sewage H. Death will result to the rat as the chlorine fumes resting on the surface will soon overcome the rat and his nose is in the oily film K.

Obviously, chlorocyanic or arsenical gas may be liberated by the addition of cyanide or arsenic in the pre-loaded cartridges.

The effectiveness and ease of operation of my method are readily apparent and the operation may be carried out with perfect safety in city sewers.

The operator, after discharging the cartridges as described, withdraws the hose E and a slight impact of the socket F against the walls of the man-hole A releases the charred cartridge which falls in the sewage H.

I claim:

1. The method of filming the surface of pools and the like, consisting in submerging metallic particles therein, protecting such particles from contact with the water, and subjecting such particles while so protected to the action of chlorine, whereby a combination of gases are generated and liberated and caused to condense by contact with the water and form a film on the surface thereof.

2. The method of filming the surface of pools and the like, consisting in submerging metallic particles and an oil-bearing reagent therein, protecting such particles and reagent from contact with the water, and subjecting such particles and reagent while so protected to the action of chlorine, whereby a combination of gases are generated and liberated and caused to condense by contact with the water and form a film on the surface thereof.

3. The method of forming a poisonous film on the surface of a pool or other body of water, consisting in submerging metallic particles and sodium cyanide therein, protecting such particles and sodium cyanide from contact with the water, and subjecting such particles and sodium cyanide, while so protected, to the action of chlorine, whereby a combination of poisonous gases are generated and liberated and caused to condense by contact with the water and form a poisonous film on the surface thereof.

4. The method of forming a poisonous film on the surface of a pool or other body of water, consisting in submerging metallic particles and sodium cyanide and combustible smoke producing material therein, protecting such particles, sodium cyanide and smoke producing material from contact with the water and subjecting such particles, sodium cyanide and smoke producing material, while so protected, to the action of chlorine, whereby a combination of poisonous gases are generated and liberated and caused to condense by contact with the water and form a poisonous film on the surface thereof, together with a covering smoke which hugs the surface.

In testimony whereof I affix my signature.

JAMES W. VAN METER.